(12) United States Patent
Jung et al.

(10) Patent No.: US 11,784,315 B2
(45) Date of Patent: Oct. 10, 2023

(54) LITHIUM SECONDARY BATTERY

(71) Applicant: LG CHEM, LTD., Seoul (KR)

(72) Inventors: Bora Jung, Daejeon (KR); Eunkyung Park, Daejeon (KR); Minchul Jang, Daejeon (KR); Byoungkuk Son, Daejeon (KR); Changhun Park, Daejeon (KR); Doyeon Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 141 days.

(21) Appl. No.: 16/625,602

(22) PCT Filed: Aug. 28, 2018

(86) PCT No.: PCT/KR2018/009887
§ 371 (c)(1),
(2) Date: Dec. 20, 2019

(87) PCT Pub. No.: WO2019/045399
PCT Pub. Date: Mar. 7, 2019

(65) Prior Publication Data
US 2021/0336274 A1    Oct. 28, 2021

(30) Foreign Application Priority Data

Aug. 28, 2017 (KR) .......................... 10-2017-0108433
Aug. 27, 2018 (KR) .......................... 10-2018-0100516

(51) Int. Cl.
*H01M 4/80* (2006.01)
*H01M 4/36* (2006.01)
(Continued)

(52) U.S. Cl.
CPC ............. *H01M 4/80* (2013.01); *H01M 4/364* (2013.01); *H01M 4/366* (2013.01); *H01M 4/382* (2013.01);
(Continued)

(58) Field of Classification Search
CPC .......... H01M 4/80; H01M 4/36; H01M 4/545; H01M 4/505; H01M 4/48; H01M 4/58
See application file for complete search history.

(56) References Cited

U.S. PATENT DOCUMENTS 5,672,446 A * 9/1997 Barker .............. H01M 10/0565
429/231.8
5,759,719 A    6/1998 Mao
(Continued)

FOREIGN PATENT DOCUMENTS

CN    1206501 A    1/1999
CN    1332484 A    1/2002
(Continued)

OTHER PUBLICATIONS

International Search Report for PCT/KR2018/009887 (PCT/ISA/210) dated Mar. 12, 2019.
(Continued)

*Primary Examiner* — Kenneth J Douyette
(74) *Attorney, Agent, or Firm* — Birch, Stewart, Kolasch & Birch, LLP (57) ABSTRACT

A lithium secondary battery including a negative electrode in which a negative electrode mixture included in the negative electrode is formed by charge and discharge of the battery. This negative electrode is formed by charge-induced formation of lithium metal on a negative electrode current collector having a three-dimensional structure form. The lithium secondary battery forms lithium metal while being blocked from the atmosphere. Therefore, formation of a
(Continued)

surface oxide layer (native oxide layer) on a negative electrode is blocked and a lithium dendrite growth suppressing effect is achieved by forming lithium metal on a negative electrode current collector having a three-dimensional structure form. The lithium secondary battery has a superior battery efficiency and reduces declines in lifetime properties.

10 Claims, 6 Drawing Sheets (51) Int. Cl.
H01M 4/48 (2010.01)
H01M 4/50 (2010.01)
H01M 4/52 (2010.01)
H01M 4/38 (2006.01)
H01M 4/505 (2010.01)
H01M 4/525 (2010.01)
H01M 4/58 (2010.01)
H01M 4/62 (2006.01)
H01M 10/052 (2010.01)
H01M 10/0562 (2010.01)
H01M 4/02 (2006.01)

(52) U.S. Cl.
CPC ........... H01M 4/483 (2013.01); H01M 4/505 (2013.01); H01M 4/525 (2013.01); H01M 4/5825 (2013.01); H01M 4/628 (2013.01); H01M 10/052 (2013.01); H01M 10/0562 (2013.01); H01M 2004/021 (2013.01); H01M 2300/0068 (2013.01)

(56) References Cited

U.S. PATENT DOCUMENTS

| | | | |
|---|---|---|---|
| 2002/0018935 A1 | 2/2002 | Okada | |
| 2003/0113627 A1* | 6/2003 | Choi | H01M 4/622 429/218.1 |
| 2004/0072066 A1 | 4/2004 | Cho et al. | |
| 2005/0095504 A1 | 5/2005 | Kim et al. | |
| 2006/0110661 A1 | 5/2006 | Lee et al. | |
| 2006/0204845 A1* | 9/2006 | Chang | H01M 4/485 429/209 |
| 2006/0257737 A1 | 11/2006 | Goh et al. | |
| 2007/0015055 A1 | 1/2007 | Lee et al. | |
| 2008/0248396 A1 | 10/2008 | Jung et al. | |
| 2012/0075771 A1 | 3/2012 | Jin et al. | |
| 2012/0251891 A1* | 10/2012 | Li | H01M 10/0525 429/309 |
| 2013/0260257 A1 | 10/2013 | Choi | |
| 2013/0309577 A1* | 11/2013 | Hayashi | H01M 4/133 429/231.8 |
| 2014/0093774 A1 | 4/2014 | Yoon | |
| 2015/0155566 A1* | 6/2015 | Kim | H01M 4/88 252/514 |
| 2015/0295246 A1 | 10/2015 | Son et al. | |
| 2016/0079641 A1* | 3/2016 | Kim | H01M 10/052 429/300 |
| 2016/0149212 A1* | 5/2016 | Zaghib | H01M 4/139 429/231.95 |
| 2016/0329567 A1 | 11/2016 | Lee et al. | |
| 2016/0344079 A1* | 11/2016 | Kim | H01M 4/8657 |
| 2016/0351889 A1* | 12/2016 | Swonger | A61F 5/566 |
| 2016/0372780 A1 | 12/2016 | Sohn et al. | |
| 2017/0077526 A1* | 3/2017 | Hiraiwa | B01D 53/92 |
| 2017/0092921 A1 | 3/2017 | Matsumura et al. | |
| 2017/0104209 A1 | 4/2017 | Son et al. | |
| 2017/0133660 A1 | 5/2017 | Kurihara et al. | |
| 2018/0034101 A1 | 2/2018 | Lee et al. | |
| 2019/0341601 A1 | 11/2019 | Park et al. | |
| 2020/0075990 A1 | 3/2020 | Park et al. | |

FOREIGN PATENT DOCUMENTS

| | | |
|---|---|---|
| CN | 1771618 A | 5/2006 |
| CN | 1780036 A | 5/2006 |
| CN | 101164186 A | 4/2008 |
| CN | 105074968 A | 11/2015 |
| JP | 9-283125 A | 10/1997 |
| JP | 11-307129 A | 11/1999 |
| JP | 2000-502831 A | 3/2000 |
| JP | 2002-237293 A | 8/2002 |
| JP | 2008-547156 A | 12/2008 |
| JP | 2010-40218 A | 2/2010 |
| JP | 2011-103278 A | 5/2011 |
| JP | 2016-91984 A | 5/2016 |
| JP | 2016-122528 A | 7/2016 |
| JP | 2016-527679 A | 9/2016 |
| JP | 2019-537226 A | 12/2019 |
| JP | 2020-510292 A | 4/2020 |
| KR | 2002-0059780 A | 7/2002 |
| KR | 10-2003-0095578 A | 12/2003 |
| KR | 10-2004-0035909 A | 4/2004 |
| KR | 10-2004-0088292 A | 10/2004 |
| KR | 10-2005-0030588 A | 3/2005 |
| KR | 10-2005-0041661 A | 5/2005 |
| KR | 10-0582557 B1 | 5/2006 |
| KR | 10-2008-0090655 A | 10/2008 |
| KR | 10-2012-0032207 A | 4/2012 |
| KR | 10-2013-0111833 A | 10/2013 |
| KR | 10-1336943 B1 | 12/2013 |
| KR | 10-2015-0030156 A | 3/2015 |
| KR | 10-2015-0143372 A | 12/2015 |
| KR | 10-2016-0052323 A | 5/2016 |
| KR | 10-1648465 B1 | 8/2016 |
| KR | 10-2016-0131267 A | 11/2016 |
| KR | 10-2016-0138120 A | 12/2016 |
| KR | 10-2016-0149509 A | 12/2016 |
| WO | WO 01/39302 A1 | 5/2001 |
| WO | WO 2005/031892 A2 | 4/2005 |
| WO | WO 2017/052818 A1 | 3/2017 |

OTHER PUBLICATIONS

Qian et al., "Anode-Free Rechargeable Lithium Metal Batteries", Functional, Materials Views, Adv. Funct. Mater. 2016, 26, pp. 7094-7102.

Qian et al., "High rate and stable cycling of lithium metal anode", Feb. 20, 2015, Macmillan Publishers Limited, pp. 1-9.

Yan et al., "Ultrathin Two-Dimensional Atomic Crystals as Stable Interfacial Layer for Improvement of Lithium Metal Anode", NANO Letters, 2014 American Chemical Society, 14, pp. 6016-6022.

Extended European Search Report, dated Jun. 5, 2020 for European Application No. 18849889.3.

* cited by examiner

LITHIUM SECONDARY BATTERY

TECHNICAL FIELD

This application claims priority to and the benefits of Korean Patent Application No. 10-2017-0108433, filed with the Korean Intellectual Property Office on Aug. 28, 2017, and Korean Patent Application No. 10-2018-0100516, filed with the Korean Intellectual Property Office on Aug. 27, 2018, the entire contents of which are incorporated herein by reference.

The present invention relates to a lithium secondary battery having a negative electrode free structure capable of enhancing battery cycle efficiency through suppressing lithium dendrite growth.

BACKGROUND ART

Various battery-requiring devices from portable phones, wireless home appliances to electric vehicles have been recently developed, and with the development of such devices, demands for secondary batteries have also increased. Particularly, with the trend of smaller electronic goods, secondary batteries tend to be lighter and smaller as well.

Corresponding to such a trend, lithium secondary batteries using lithium metal as an active material have recently received attention. Lithium metal has a property of low oxidation-reduction potential (−3.045 V with respect to standard hydrogen electrode) and large weight energy density (3,860 mAhg$^{-1}$), and has been expected as a negative electrode material of high capacity secondary batteries.

However, when using lithium metal as a battery negative electrode, the battery is generally manufactured by attaching lithium foil on a flat current collector, and since lithium explosively reacts with water and also reacts with oxygen in the atmosphere with its high reactivity as an alkali metal, there is a disadvantage in that manufacture and use are difficult under general environments. Particularly, an oxide layer such as LiOH, Li$_2$O and Li$_2$CO$_3$ is obtained as a result of oxidation when lithium metal is exposed to the atmosphere. When a surface oxide layer (native layer) is present on the surface, the oxide layer functions as an insulator film decreasing electrical conductivity, and causes a problem of increasing electric resistance by inhibiting smooth lithium ion migration.

For such a reason, the problem of forming a surface oxide layer caused by lithium metal reactivity has been partly improved by performing a vacuum deposition process in forming a lithium negative electrode, however, fundamental suppression of surface oxide layer formation is still impossible by the exposure to the atmosphere during a battery assembly process. In view of the above, development of a lithium metal electrode capable of resolving a lithium reactivity problem and more simplifying a process while increasing energy efficiency by using lithium metal has been required.

PRIOR ART DOCUMENTS

Patent Documents

[Patent Document 1] Korean Patent Application Laid-Open Publication No. 10-2016-0052323 "Lithium Electrode and Lithium Battery Including the Same"

DISCLOSURE

Technical Problem

As a result of extensive studies in view of the above, the inventors of the present invention have designed a negative electrode free battery structure capable of forming a lithium metal layer on a negative electrode current collector by lithium ions transferred from a positive electrode active material through charge after assembling the battery so as to fundamentally block a contact of the lithium metal with the atmosphere when assembling the battery, and have developed a lithium secondary battery having enhanced battery cycle efficiency through lowering current density by using, as the negative electrode current collector, a negative electrode current collector having a three-dimensional structure form with pores formed therein.

Accordingly, an aspect of the present invention provides a lithium secondary battery having enhanced performance and lifetime by resolving problems caused by lithium metal reactivity and high current density, and problems occurring during an assembly process.

Technical Solution

According to an aspect of the present invention, there is provided a lithium secondary battery comprising a positive electrode, a negative electrode, and a separator and an electrolyte provided therebetween, wherein lithium ions migrate from the positive electrode by charge to form lithium metal on a negative electrode current collector, and the negative electrode current collector has a three-dimensional structure form.

Herein, the lithium metal is formed through one-time charge with a voltage of 4.5 V to 2.5 V.

In addition, the negative electrode current collector may be further provided with a protective film on a side surface adjoining the separator.

Advantageous Effects

A lithium secondary battery according to the present invention is coated while being blocked from the atmosphere through a process of forming lithium metal on a negative electrode current collector, and therefore, may suppress formation of a surface oxide layer in the lithium metal caused by oxygen and moisture in the atmosphere, and as a result, an effect of enhancing cycle lifetime properties is obtained.

In addition, by using a three-dimensional structure form having pores formed therein as the negative electrode current collector of the lithium secondary battery instead of an existing simple layer form, current density is lowered, and as a result, an effect of suppressing lithium dendrite growth can be more strengthened, and battery cycle efficiency can be enhanced therefrom.

Furthermore, a lithium ion conducting protective film on the current collector suppresses side reactions at an interface between an electrolyte liquid and lithium, and is capable of preventing dead lithium occurrences caused by lithium dendrite growth, and as a result, battery lifetime and cycle efficiency can be enhanced.

BEST MODE

Hereinafter, the present invention will be described in detail with reference to accompanying drawings so that those skilled in the art may readily implement the present invention. However, the present invention may be embodied into various different forms, and is not limited to the present specification.

In the drawings, parts not relevant to the descriptions are not included in order to clearly describe the present invention, and like reference numerals are used for like elements throughout the specification. In addition, sizes and relative sizes of constituents shown in the drawings are unrelated to actual scales, and may be reduced or exaggerated for clarity of the descriptions.

The term "negative electrode free (anode free) battery" used in the present invention generally means a lithium secondary battery including a negative electrode in which a negative electrode mixture included in the negative electrode is formed by charge and discharge of the battery. Herein, the anode has the same meaning as the negative electrode.

In other words, a negative electrode free battery in the present invention may be a battery that is negative electrode free in which a negative electrode is not formed on a negative electrode current collector in initial assembly, or may be a concept including all batteries that may have a negative electrode formed on a negative electrode current collector depending on use.

In addition, in the negative electrode of the present invention, the form of lithium metal formed on a negative electrode current collector as a negative electrode includes both a form in which lithium metal is formed into a layer, and a structure in which lithium metal is not formed into a layer (for example, a structure in which lithium metal aggregates in a particle form).

Hereinafter, the present invention is described based on a form of a lithium metal layer in which lithium metal is formed into a layer, however, it is obvious that such a description does not exclude a structure in which lithium metal is not formed into a layer.

Figure 1:
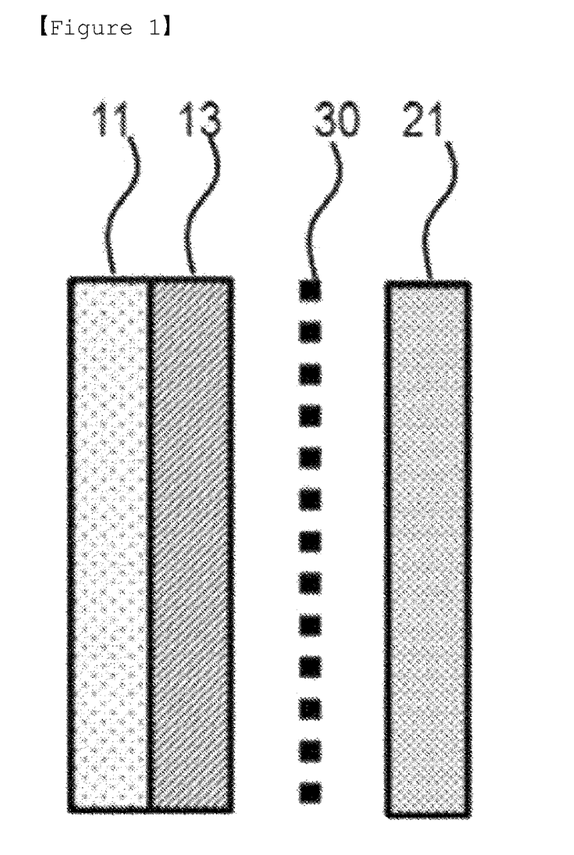
FIG. 1 is a mimetic diagram of a lithium secondary battery manufactured according to a first embodiment of the present invention.

FIG. 1 is a mimetic diagram of a lithium secondary battery manufactured according to a first embodiment of the present invention, which is provided with a positive electrode including a positive electrode current collector (11) and a positive electrode mixture (13); a negative electrode including a negative electrode current collector (21); and a separator (30) and an electrolyte (not shown) provided therebetween.

As for a negative electrode of a lithium secondary battery, the negative electrode is normally formed on a negative electrode current collector (21), however, in the present invention, a negative electrode free battery structure is assembled using only with a negative electrode current collector (21), and then, through charge, lithium ions released from a positive electrode mixture (13) form a lithium metal (not shown) on the negative electrode current collector(21) as a negative electrode mixture to form a negative electrode having a known constitution of negative electrode current collector/negative electrode mixture, and as a result, a constitution of a common lithium secondary battery is formed.

Figure 2:
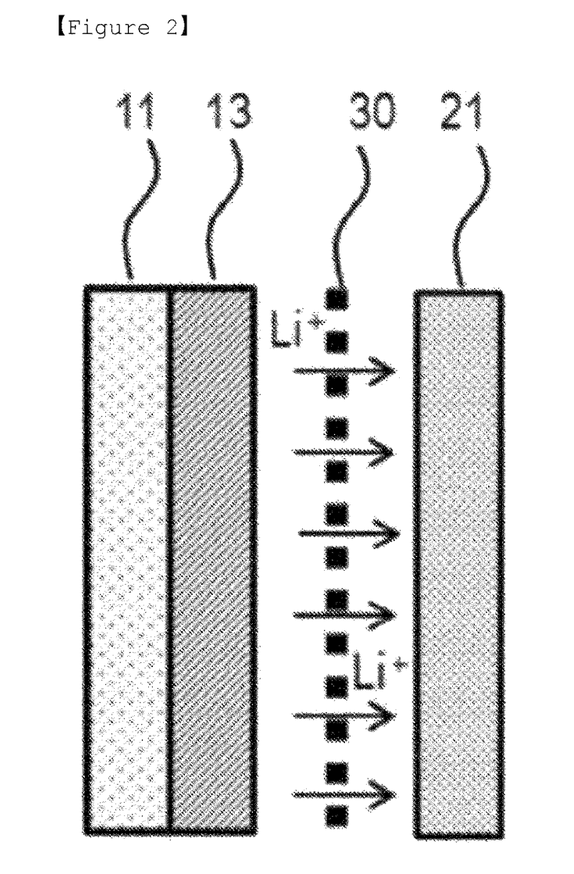
FIG. 2 is a mimetic diagram showing lithium ion (Li⁺) migration when initially charging a lithium secondary battery manufactured according to a first embodiment of the present invention.
Figure 3:
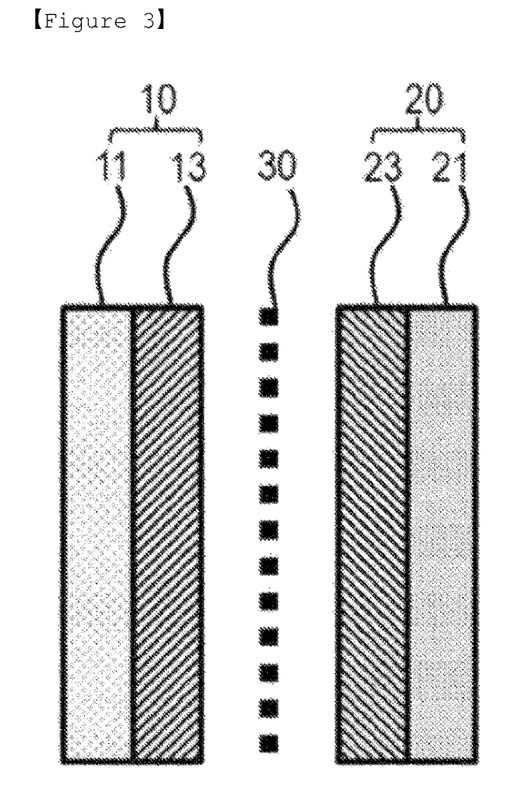
FIG. 3 is a mimetic diagram after completing initial charge of a lithium secondary battery manufactured according to a first embodiment of the present invention.

FIG. 2 is a mimetic diagram showing lithium ion (Lit) migration when initially charging a lithium secondary battery manufactured according to a first embodiment of the present invention, and FIG. 3 is a mimetic diagram after completing initial charge of a lithium secondary battery manufactured according to a first embodiment of the present invention.

When describing with reference to FIG. 2 and FIG. 3, lithium ions are released from a positive electrode mixture (13) in a positive electrode (10) when charging a lithium secondary battery having a negative electrode free battery structure by applying a voltage of certain level or higher, and these ions migrate toward a negative electrode current collector (21) side after passing through a separator (30), and lithium metal (23) formed purely with lithium is formed on the negative electrode current collector (21) to form a negative electrode (20).

Such lithium metal (23) formation through charge has advantages of forming a thin film layer and very readily controlling interface properties compared to an existing negative electrode sputtering lithium metal (23) on a negative electrode current collector (21) or laminating lithium foil and a negative electrode current collector (21). In addition, since binding strength of the lithium metal (23) laminated on the negative electrode current collector (21) is high and stable, a problem of being removed from the negative electrode current collector (21) by going back to an ionization state through discharge does not occur.

Particularly, by being formed to have a negative electrode free battery structure, the lithium metal is not exposed to the atmosphere at all during a battery assembly process, and therefore, existing problems such as forming a surface oxide layer due to high reactivity of lithium itself, and a decrease in the lifetime of a lithium secondary battery caused therefrom may be fundamentally blocked.

In order to secure the above-described effects, an organic electrolyte liquid may be used as the electrolyte in the negative electrode free battery structure of the present invention, and the organic electrolyte liquid may include a lithium salt and an organic solvent.

As the lithium salt, LiCl, LiBr, LiI, LiClO$_4$, LiBF$_4$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li LiSCN, LiC(CF$_3$SO$_2$)$_3$, (CF$_3$SO$_2$)$_2$NLi, (FSO$_2$)$_2$NLi, chloroborane lithium, lower aliphatic carboxylic acid lithium, lithium tetraphenylborate, lithium imide or the like may be used.

The concentration of the dissociable salt with respect to the organic solvent may be from 0.1 M to 5.0 M. In this case, the gel polymer electrolyte may have proper viscosity as a gel form, and the dissociable salt being dissolved in the organic solvent may contribute to effective lithium ion migration.

The organic solvent may be one or more types selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate, fluoroethylene carbonate (FEC), dimethyl carbonate (DMC), diethyl carbonate (DEC), dipropyl carbonate, ethylmethyl carbonate (EMC), methylpropyl carbonate, ethylpropyl carbonate, dimethyl ether, diethyl ether, dipropyl ether, methylethyl ether, methylpropyl ether, ethylpropyl ether, methyl acetate, ethyl acetate, propyl acetate, methyl propionate, ethyl propionate, propyl propionate, γ-butyrolactone, γ-valerolactone, γ-caprolactone, α-valorolactone and α-caprolactone.

For crosslinking, common crosslinking agents or initiators may be used.

Nonlimiting examples of the initiator may include organic peroxides or hydroperoxides such as benzoyl peroxide, acetyl peroxide, dilauryl peroxide, di-tert-butyl peroxide, t-butyl peroxy-2-ethyl-hexanoate, cumyl hydroperoxide and hydrogen peroxide, azo compounds such as 2,2'-azobis(2-cyanobutane), 2,2'-azobis(methylbutyronitrile), 2,2'-azobis (iso-butyronitrile) (AIBN) and 2,2'-azobisdimethyl-valeronitrile (AMVN), and the like, but are not limited thereto.

The negative electrode current collector (21) capable of forming lithium metal (23) through charge is not particularly limited as long as it has conductivity without inducing chemical changes to a lithium secondary battery. As an example, copper, stainless steel, aluminum, nickel, titanium, baked carbon, copper or stainless steel of which surface is treated with carbon, nickel, titanium, silver and the like, aluminum-cadmium alloys and the like may be used.

In addition, like the positive electrode current collector (11), various forms such as films, sheets, foil, nets, porous bodies, foams and non-woven fabrics having micro-unevenness formed on the surface may be used as the negative electrode current collector (21).

Specifically, the negative electrode current collector (21) has a three-dimensional structure form, and may have a thickness of 20 μm to 200 μm, preferably 50 μm to 150 μm, and more preferably 80 μm to 120 μm. When the thickness of the negative electrode current collector (21) is less than the above-mentioned range, the lithium metal layer formed inside the negative electrode current collector (21) is formed outside the porous current collector resulting in a decrease in the dendrite suppression effect leading to decline in the battery performance, and when the thickness is greater than the above-mentioned range, the battery thickness becomes large, which is disadvantageous for commercialization.

In addition, the negative electrode current collector (21) may have porosity of 50% to 90%, preferably 60% to 85%, and more preferably 70% to 85%. When the porosity of the negative electrode current collector (21) is less than the above-mentioned range, the lithium metal formed inside the negative electrode current collector is formed outside the porous current collector resulting in a decrease in the dendrite suppression effect, and when the porosity is greater than the above-mentioned range, strength of the negative electrode current collector (21) is unstable making a battery manufacturing process difficult.

The lithium secondary battery having such a negative electrode free structure may be obtained using various methods, however, a method of controlling a composition used in a positive electrode mixture (13) may be used in the present invention.

As the positive electrode mixture (13), various positive electrode active materials may be used depending on the battery type, and although the positive electrode active material used in the present invention is not particularly limited as long as it is capable of intercalating or deintercalating lithium ions, a lithium transition metal oxide is typically used currently as a positive electrode active material capable of obtaining a battery with excellent lifetime properties and charge and discharge efficiency.

The lithium transition metal oxide includes 2 or more transition metals, and examples thereof may include layer compounds such as lithium cobalt oxide ($LiCoO_2$) or lithium nickel oxide ($LiNiO_2$) substituted with one or more transition metals; lithium manganese oxides substituted with one or more transition metals, lithium nickel-based oxides, spinel-based lithium nickel manganese composite oxides, spinel-based lithium manganese oxides in which some of Li in the chemical formula are substituted with alkaline-earth metal ions, olivine-based lithium metal phosphates and the like, but are not limited thereto.

Lithium-containing transition metal oxides are preferably used, and for example, one or more types selected from the group consisting of $LiCoO_2$, $LiNiO_2$, $LiMnO_2$, $LiMn_2O_4$, $Li(Ni_aCo_bMn_c)O_2$ (0<a<1, 0<b<1, 0<c<1, a+b+c=1), $LiNi_{1-y}Co_yO_2$, $LiCo_{1-y}MnYO_2$, $LiNi_{1-y}MnYO_2$ (herein, 0≤Y<1), $Li(Ni_aCo_bMn_c)O_4$ (0<a<2, 0<b<2, 0<c<2, a+b+c=2), $LiMn_{2-z}Ni_zO_4$, $LiMn_{2-z}Co_zO_4$ (herein, 0<z<2), $Li_xM_yMn_{2-y}O_{4-z}A_z$ (herein, 0.9≤x≤1.2, 0<y<2, 0≤z<0.2, M is one or more of Al, Mg, Ni, Co, Fe, Cr, V, Ti, Cu, B, Ca, Zn, Zr, Nb, Mo, Sr, Sb, W, Ti and Bi, A is one or more anions with valency of −1 or −2), $Li_{1+a}NibM'_{1-b}O_{2-c}A'_c$ (0≤a≤0.1, 0≤b≤0.8, 0≤c<0.2, M' is one or more types selected from the group consisting of 6-coordinated stable elements such as Mn, Co, Mg and Al, and A' is one or more anions having valency of −1 or −2), $LiCoPO_4$ and $LiFePO_4$, and preferably, $LiCoO_2$ is used. In addition, sulfides, selenides, halides and the like may also be used in addition to such oxides.

The lithium transition metal oxide is used in the positive electrode mixture (13) as a positive electrode active material together with a binder, a conductor and the like. In the negative electrode free battery structure of the present invention, a lithium source for forming the lithium metal layer (23) becomes the lithium transition metal oxide. In other words, lithium ions in the lithium transition metal oxide is detached when charging in a specific voltage range, and form a lithium metal layer (23) on the negative electrode current collector (21).

However, since lithium ions in the lithium transition metal oxide are not readily deintercalated by itself or lithium ions are not deintercalated at the above-mentioned operating voltage level, there is no lithium capable of being involved in charge and discharge, and therefore, it is actually very difficult to form the lithium metal layer (23), and even when the lithium metal layer is formed, functions of the lithium transition metal oxide as a lithium positive electrode active material decline. As a result, when using only the lithium transition metal oxide, irreversible capacity greatly decreases causing a problem of declining capacity and lifetime properties of a lithium secondary battery.

Accordingly, in the present invention, a lithium metal compound, a highly irreversible material having a difference between charge capacity and discharge capacity (irreversible capacity) of 200 mAh/g or greater and having initial irreversibility of 50% or greater when one-time charge is progressed with 0.01 C to 0.2 C in a voltage range of 4.5 V to 2.5 V, is used as an additive capable of providing a lithium source together with the lithium transition metal oxide.

The 'highly irreversible material' mentioned in the present invention may be used to have the same meaning as a 'large capacity irreversible material' in another term, and this means a material having large irreversible capacity of a first cycle of charge and discharge, that is, "(first cycle charge capacity-first cycle discharge capacity)/first cycle charge capacity". In other words, a highly irreversible material may irreversibly provide lithium ions in excess during a first cycle of charge and discharge. For example, it may be, among lithium transition metal compounds capable of intercalating or deintercalating lithium ions, a positive electrode material having high irreversible capacity (first cycle charge capacity-first cycle discharge capacity) of a first cycle of charge and discharge.

Irreversible capacity of a generally used positive electrode active material is approximately from 2% to 10% with respect to initial capacity, however, in the present invention, 30% or greater and preferably 50% or greater with respect to initial charge capacity is preferred, and a lithium metal compound having highly irreversible material initial charge capacity of 200 mAh/g or greater and preferably 230 mAh/g or greater is used. With such lithium metal compound use, a role of a lithium source capable of forming the lithium metal layer (23) may be performed while increasing irreversible capacity of the lithium transition metal oxide, a positive electrode active material.

As the lithium metal compound provided in the present invention, compounds represented by the following Chemical Formula 1 to Chemical Formula 8 may be used.

$$Li_2Ni_{1-a}M^1_aO_2 \quad \text{[Chemical Formula 1]}$$

(In the formula, a is 0≤a<1, and $M^1$ is one or more types of elements selected from the group consisting of Mn, Fe, Co, Cu, Zn, Mg and Cd.)

$$Li_{2+b}Ni_{1-c}M^2_cO_{2+d} \quad \text{[Chemical Formula 2]}$$

(In the formula, −0.5b<0.5, 0≤c<1, 0≤f<0.3, and $M^2$ is one or more types of elements selected from the group consisting of P, B, C, Al, Sc, Sr, Ti, V, Zr, Mn, Fe, Co, Cu, Zn, Cr, Mg, Nb, Mo and Cd.)

$$LiM^3_eMn_{1-e}O_2 \quad \text{[Chemical Formula 3]}$$

(x is 0≤e<0.5, and $M^3$ is one or more types of elements selected from the group consisting of Cr, Al, Ni, Mn and Co.)

$$Li_2M^4O_2 \quad \text{[Chemical Formula 4]}$$

(In the formula, $M^4$ is one or more types of elements selected from the group consisting of Cu and Ni.)

$$Li_{3+f}Nb_{1-g}M^5_gS_{4-h} \quad \text{[Chemical Formula 5]}$$

(In the formula, −0.1≤f≤1, 0≤g≤0.5, −0.1≤h≤0.5, and $M^5$ is one or more types of elements selected from the group consisting of Mn, Fe, Co, Cu, Zn, Mg and Cd.)

$$LiM^6_iMn_{1-i}O_2 \quad \text{[Chemical Formula 6]}$$

(In the formula, i is 0.05≤x<0.5, and $M^6$ is one or more types of elements selected from the group consisting of Cr, Al, Ni, Mn and Co.)

$$LiM^7_{2j}Mn_{2-2j}O_4 \quad \text{[Chemical Formula 7]}$$

(In the formula, j is 0.05≤x<0.5, and $M^7$ is one or more types of elements selected from the group consisting of Cr, Al, Ni, Mn and Co.)

$$Li_k\text{-}M^8_m\text{-}N_n \quad \text{[Chemical Formula 8]}$$

(In the formula, $M^8$ represents an alkaline-earth metal, k/(k+m+n) is from 0.10 to 0.40, m/(k+m+n) is from 0.20 to 0.50, and n/(k+m+n) is from 0.20 to 0.50.)

The lithium metal compounds of Chemical Formula 1 to Chemical Formula 8 have different irreversible capacity depending on the structure. These may be used either alone or as a mixture thereof, and perform a role of increasing irreversible capacity of a positive electrode active material.

As one example, the highly irreversible materials represented by Chemical Formulae 1 and 3 have different irreversible capacity depending on the type, and as one example, have numerical values as shown in the following Table 1.

TABLE 1

| | Initial Charge Capacity (mAh/g) | Initial Discharge Capacity (mAh/g) | Initial Coulombic Efficiency | Initial Irreversible Capacity Ratio |
|---|---|---|---|---|
| [Chemical Formula 1] $Li_2NiO_2$ | 370 | 110 | 29.7% | 70.3% |
| [Chemical Formula 3] $LiMnO_2$ | 230 | 100 | 43.5% | 56.5% |
| [Chemical Formula 3] $LiCr_xMn_{1-x}O_2$ | 230 | 80 | 34.8% | 65.2% |

In addition, the lithium metal compound of Chemical Formula 2 preferably belongs to space group Immm, and among these, Ni and M composite oxide forming a plane quadrature (Ni, M)O4 and the plane quadrature forming a primary chain while sharing an opposite side (side formed by O—O) is more preferred. The compound of Chemical Formula 2 preferably has a crystal lattice constant of a=3.7±0.5 Å, b=2.8±0.5 Å, c=9.2±0.5 Å, α=90°, β=90° and γ=90°.

In addition, the lithium metal compound of Chemical Formula 8 has an alkaline-earth metal content of 30 atom % to 45 atom %, and a nitrogen content of 30 atom % to 45 atom %. Herein, when the alkaline-earth metal content and the nitrogen content are in the above-mentioned range, thermal properties and lithium ion conducting properties of the compound of Chemical Formula 1 are excellent. In Chemical Formula 8, k/(k+m+n) is from 0.15 to 0.35 and for example, is from 0.2 to 0.33, m/(k+m+n) is from 0.30 to 0.45, and for example, is from 0.31 to 0.33, and n/(k+m+n) is from 0.30 to 0.45, and for example, is from 0.31 to 0.33.

According to one embodiment, a is from 0.5 to 1, b is 1 and c is 1 in the electrode active material of Chemical Formula 1.

In the positive electrode mixture (13) according to the present invention, the content of the positive electrode active material and the content of the lithium metal compound need to be limited. In other words, parameters affected by the content of the lithium metal compound are a lithium metal layer (23) thickness and a loading amount in the positive electrode active material, and these two are in a trade-off relation to each other.

Lifetime properties are normally improved as a lithium metal layer (23) thickness increases. Therefore, when the content of the lithium metal compound, a lithium source, is high, an advantage of increasing a thickness of the lithium metal layer (23) formed on the negative electrode current collector (21) may be secured, however, there is a problem in that the loading amount of the positive electrode active material loaded inside the whole positive electrode mixture decreases. Such a decreased loading amount of the positive electrode active material causes overall battery capacity decline. On the contrary, when the lithium metal compound content is low, there is a disadvantage in that irreversibility may not be sufficiently compensated despite the high loading amount of the positive electrode active material, however, the lithium metal layer (23) may be formed to be relatively thinner compared to commercially available lithium foil, and the battery may be thinner and lighter.

For such a reason, the positive electrode active material and the lithium metal compound are used in a weight ratio of 1:9 to 9:1, 2:8 to 8:2 or 3:7 to 7:3 in the positive electrode mixture (13) provided in the present invention, and preferably, the lithium metal compound is favorably used in 70% or less with respect to the total weight of the positive electrode mixture. Specifically, the positive electrode active material and the lithium metal compound are preferably used in a weight ratio range of 9:1 to 3:7. Through such a content range, the positive electrode mixture of the present invention has a loading amount of 1 mAh/cm$^2$ to 10 mAh/cm$^2$, preferably a loading amount of 2 mAh/cm$^2$ to 10 mAh/cm$^2$, and more preferably a loading amount of 3 mAh/cm$^2$ to 10 mAh/cm$^2$. In addition, by the lithium secondary battery of the present invention using such a positive electrode mixture, a secondary battery having lithium formed in the negative electrode after first charge may be formed.

By adjusting irreversible capacity of the positive electrode, the lithium metal compound of Chemical Formulae 1 to 8 may accomplish a capacity recovery of 90% or higher after an overdischarge test without decreasing battery capacity. The lithium metal compound is a material capable of deintercalating 1 mole or more of lithium ions during the first cycle charge, and intercalating and deintercalating 1 mole or less of lithium ions from the first cycle discharge and in subsequent cycles. Accordingly, when adding the lithium metal compound to the positive electrode, excess lithium (Li) may be formed as much as target capacity in the first cycle by forming Li in the negative electrode as much as irreversible capacity of the positive electrode.

The positive electrode active material according to the present invention includes the lithium transition metal oxide and the lithium metal compound of Chemical Formula 1 to Chemical Formula 8, and herein, the form is not particularly limited as long as lithium may be irreversibly deintercalated from the lithium metal sulfur compound.

As one example, the positive electrode active material and the lithium metal compound may be dispersed into the positive electrode mixture (13) while being mixed with each other, or may be formed in a core-shell structure. In the core-shell structure, the core may be the positive electrode active material or the lithium metal compound, and the shell may be the lithium metal or the positive electrode active material. In addition, when necessary, the mixture form thereof may form each of the core and the shell. The shell may be formed in a single layer or a multilayer of one or more layers. Preferably, when forming the lithium metal compound in the shell, lithium ions may be readily deintercalated from the lithium metal compound by battery charge.

In one specific example, the lithium metal compound may be coated on the current collector while being mixed with the positive electrode active material.

In another specific example, a first coating layer including the positive electrode active material is coated on the current collector, and a coating layer including the lithium metal compound may be coated on the first coating layer.

Specifically, the first coating layer is formed with the positive electrode active material, a conductor and a binder, and the second coating layer is formed with the lithium metal compound, a conductor and a binder, and therefore, the lithium metal compound of the second coating layer is converted to an irreversible state during a secondary battery activation process, and may function as a protective layer of the first coating layer.

In other words, the second coating layer has a metal sulfur compound form in which lithium is removed from the lithium metal compound, and is thermally and electrochemically stable, and therefore, may protect the first coating layer by suppressing side reactions of an electrode and an electrolyte liquid, and the like.

Such a simply mixed and core-shell-structured positive electrode active material may be used by the content described above.

Additionally, the positive electrode active material according to the present invention may further use known materials capable of increasing irreversible capacity, for example, materials such as Li$_x$VO$_3$(1≤x≤6), Li$_3$Fe$_2$(PO$_4$)$_3$, Li$_3$Fe$_2$(SO$_4$)$_3$ or Li$_3$V(PO$_4$)$_3$, or materials such as MnO$_2$, MoO$_3$, VO$_2$, V$_2$O$_5$, V$_6$O$_{13}$, Cr$_3$O$_8$, CrO$_2$, Al$_2$O$_3$, ZrO$_2$, AlPO$_4$, SiO$_2$, TiO$_2$ or MgO.

The materials are used in 60 parts by weight or less, in 50 parts by weight or less, and preferably in 40 parts by weight with respect to 100 parts by weight of the positive electrode active material.

Charge for forming the lithium metal (23) in the present invention is performed in a voltage range of 4.5 V to 2.5 V. When the charge is performed below the above-mentioned range, the lithium metal (23) is difficult to form, and when the charge is performed above the above-mentioned range, cell damage is caused, and charge and discharge are not properly progressed after overdischarge occurs.

The formed lithium metal (23) forms a uniform continuous or discontinuous layer on the negative electrode current collector (21). As one example, when the negative electrode current collector (21) has a foil form, a continuous thin film form may be obtained, and when the negative electrode current collector (21) has a three-dimensional porous structure, the lithium metal (23) may be discontinuously formed. In other words, the discontinuous layer has a discontinuously distributed form, and, by a region in which the lithium metal (23) is present and a region in which the lithium metal (23) is not present being present in a specific region and the region in which the lithium metal (23) is not present being distributed so as to isolate, disconnect or separate the region in which the lithium compound is present like an island type, means the region in which the lithium metal (23) is present being distributed without continuity.

The lithium metal (23) formed through such charge and discharge has a thickness of a minimum of 50 nm or greater, 100 μm or less, and preferably 1 μm to 50 μm in order to function as a negative electrode. When the thickness is less than the above-mentioned range, battery charge and discharge efficiency rapidly decreases, and, on the contrary, the thickness being greater than the above-mentioned range has a problem of reducing energy density of a battery although lifetime properties and the like are stable.

Particularly, by the lithium metal (23) provided in the present invention being prepared into a negative electrode free battery without lithium metal when assembling a battery, no or almost no oxide layer is formed on the lithium metal (23) due to high reactivity of lithium produced during an assembly process compared to a lithium secondary battery assembled using existing lithium foil. As a result, degradation in the battery lifetime caused by the oxide layer may be prevented.

In addition, the lithium metal (23) moves by charging a highly irreversible material, and compared to forming a lithium metal (23) on a positive electrode, a more stable lithium metal (23) may be formed. When attaching lithium metal on a positive electrode, a chemical reaction may occur between the positive electrode and the lithium metal.

A positive electrode mixture (13) is formed including the positive electrode active material and the lithium metal compound, and herein, the positive electrode mixture (13) may further include a conductor, a binder, and other additives commonly used in a lithium secondary battery.

The conductor is used for further enhancing conductivity of the electrode active material. Such a conductor is not particularly limited as long as it has conductivity without inducing chemical changes to the corresponding battery, and examples thereof may include graphite such as natural graphite or artificial graphite; carbon black such as carbon black, acetylene black, ketjen black, channel black, furnace black, lamp black or thermal black; conductive fibers such as carbon fiber or metal fiber; fluorocarbon, aluminum, metal powders such as nickel powder; conductive whiskers such as zinc oxide or potassium titania; conductive metal oxides such as titanium oxide; polyphenylene derivatives and the like.

A binder may be further included for binding the positive electrode active material, the lithium metal compound and the conductor, and for binding on the current collector. The binder may include a thermoplastic resin or a thermosetting resin. For example, polyethylene, polypropylene, polytetrafluoroethylene (PTFE), polyvinylidene fluoride (PVDF), styrene-butadiene rubber, a tetrafluoroethylene-perfluoro alkylvinyl ether copolymer, a vinylidene fluoride-hexafluoropropylene copolymer, a vinylidene fluoride-chlorotrifluoroethylene copolymer, an ethylene-tetrafluoroethylene copolymer, a polychlorotrifluoroethylene, vinylidene fluoride-pentafluoropropylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-per fluoromethylvinyl ether-tetrafluoroethylene copolymer, an ethylene-acrylic acid copolymer and the like may be used either alone or as a mixture, however, the binder is not limited thereto, and those capable of being used as a binder in the art may all be used.

Examples of other additives may include a filler. The filler is selectively used as a component suppressing electrode expansion, and is not particularly limited as long as it is a fibrous material without inducing chemical changes to the corresponding battery. For example, olefin-based polymers such as polyethylene or polypropylene, or fibrous materials such as glass fiber or carbon fiber may be used.

The positive electrode mixture (13) of the present invention is formed on a positive electrode current collector (11).

The positive electrode current collector is generally prepared to a thickness of 3 μm to 500 μm. Such a positive electrode current collector (11) is not particularly limited as long as it has high conductivity without inducing chemical changes to a lithium secondary battery, and for example, stainless steel, aluminum, nickel, titanium, baked carbon, or aluminum or stainless carbon of which surface is treated with carbon, nickel, titanium, silver and the like may be used. Herein, the positive electrode current collector (11) may be used in various forms such as films, sheets, foil, nets, porous bodies, foams and non-woven fabrics having microunevenness formed on the surface so as to increase adhesive strength with a positive electrode active material.

A method of coating the positive electrode mixture (13) on the current collector may include a method of distributing the electrode mixture slurry on the current collector and then uniformly dispersing the result using a doctor blade or the like, a method such as die casting, comma coating or screen printing, and the like. In addition, the electrode mixture slurry may be bonded with the current collector using a pressing or lamination method after molding on a separate substrate, however, the method is not limited thereto.

Figure 4:
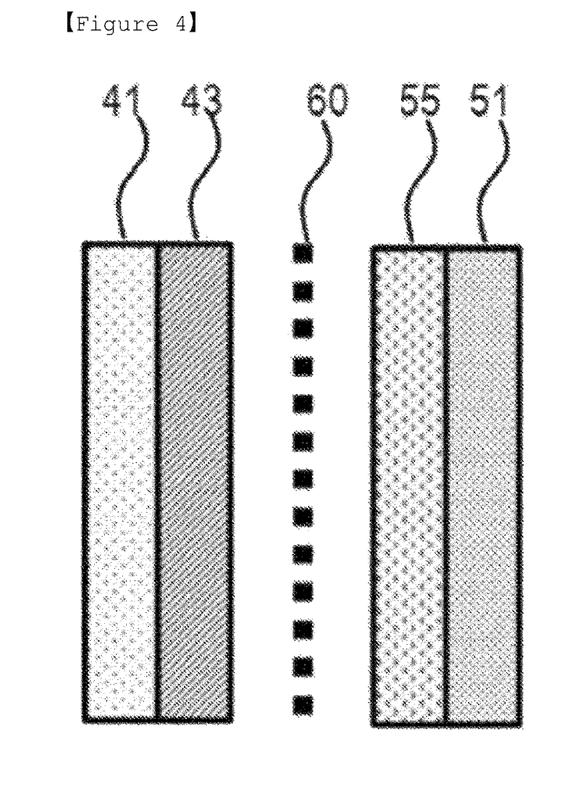
FIG. 4 is a mimetic diagram of a lithium secondary battery manufactured according to a second embodiment of the present invention.
Figure 5:
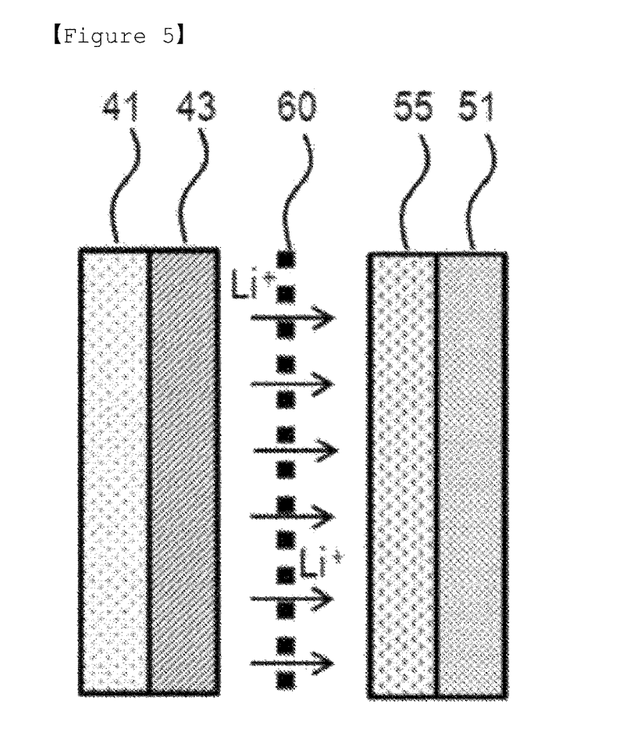
FIG. 5 is a mimetic diagram showing lithium ion (Li⁺) migration when initially charging a lithium secondary battery manufactured according to a second embodiment of the present invention.

Meanwhile, the lithium secondary battery according to a second embodiment of the present invention may form a protective film (55) on the negative electrode current collector (51) on a surface adjoining a separator (60).

In other words, when forming the protective film (55), lithium metal (23) is formed on the negative electrode current collector (51) by, as shown in FIG. 4, lithium ions transferred from the positive electrode mixture (43) passing through the protective film (55).

Accordingly, any material may be used as the protective film (55) as long as it is capable of smoothly transferring lithium ions, and materials used in lithium ion conducting polymers and/or inorganic solid electrolytes may be used, and as necessary, a lithium salt may be further included.

Examples of the lithium ion conducting polymer may include any one selected from the group consisting of polyethylene oxide (PEO), polyacrylonitrile (PAN), polymethyl methacrylate (PMMA), polyvinylidene fluoride (PVDF), polyvinylidene fluoride-hexafluoropropylene (PVDF-HFP), LiPON, $Li_3N$, $LixLa_{1-x}TiO_3$ (0<x<1) and $Li_2S-GeS-Ga_2S_3$, or a mixture of two or more types thereof, but are not limited thereto, and polymers having lithium ion conductivity may be used without limit.

As for the formation of the protective film (55) using the lithium ion conducting polymer, a coating solution dissolving or swelling the lithium ion conducting polymer in a solvent is prepared, and the solution is coated on the negative electrode current collector (51).

As for the coating method, a method may be selected from among known methods or proper new methods may be used considering material properties and the like. For example, a method of distributing a composition for the polymer protective film on the current collector, and then uniformly dispersing the result using a doctor blade or the like is preferred. In some cases, a method of performing distribution and dispersion in one process may also be used. In addition thereto, methods of dip coating, gravure coating, slit die coating, spin coating, comma coating, bar coating, reverse roll coating, screen coating, cap coating and the like may be used in the preparation. Herein, the negative electrode current collector (51) is the same as described above.

After that, a drying process may be carried out for the protective film (55) formed on the negative electrode current collector (51), and herein, the drying process may be carried out using a method of heating treatment or hot air drying at a temperature of 80° C. to 120° C. depending on the solvent type used in the lithium ion conducting polymer.

Herein, the used solvent preferably has a similar solubility index with the lithium ion conducting polymer, and has a low boiling point. This is due to the fact that the mixing may be uniform, and the solvent may be readily removed thereafter. Specifically, N,N-dimethylacetamide (DMAc), dimethyl sulfoxide (DMSO), N,N-dimethylformamide (DMF), acetone, tetrahydrofuran, methylene chloride, chloroform, dimethylformamide, N-methyl-2-pyrrolidone (NMP), cyclohexane, water or a mixture thereof may be used as the solvent.

When using the lithium ion conducting polymer, materials used for further increasing lithium ion conductivity may be further included.

As one example, a lithium salt such as LiCl, LiBr, LiI, $LiClO_4$, $LiBF_4$, $LiB_{10}Cl_{10}$, $LiPF_6$, $LiCF_3SO_3$, $LiCF_3CO_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lower aliphatic carboxylic acid lithium, lithium tetraphenylborate or lithium imide may be further included.

The inorganic solid electrolyte is a ceramic-based material, and crystalline or non-crystalline materials may be used, and inorganic solid electrolytes such as thio-LISICON (Li$_{3.25}$Ge$_{0.25}$P$_{0.75}$S$_4$), Li$_2$S—SiS$_2$, LiI—Li$_2$S—SiS$_2$, LiI—Li$_2$S—P$_2$S$_5$, LiI—Li$_2$S—P$_2$O$_5$, LiI—Li$_3$PO$_4$—P$_2$S$_5$, Li$_2$S—P$_2$S$_5$, Li$_3$PS$_4$, Li$_7$P$_3$S$_{11}$, Li$_2$O—B$_2$O$_3$, Li$_2$O—B$_2$O$_3$—P$_2$O$_5$, Li$_2$O—V$_2$O$_5$—SiO$_2$, Li$_2$O—B$_2$O$_3$, Li$_3$PO$_4$, Li$_2$O—Li$_2$WO$_4$—B$_2$O$_3$, LiPON, LiBON, Li$_2$O—SiO$_2$, LiI, Li$_3$N, Li$_5$La$_3$Ta$_2$O12, Li$_7$La$_3$Zr$_2$O$_{12}$, Li$_6$BaLa$_2$Ta$_2$O$_{12}$, Li$_3$PO$_{(4-3/2w)}$Nw (w is w<1) or Li$_{3.6}$Si$_{0.6}$P$_{0.4}$O$_4$ may be used. Herein, when using the inorganic solid electrolyte, a lithium salt may be further included as necessary.

The inorganic solid electrolyte may be mixed with known materials such as a binder, and used in a thick film form through slurry coating. In addition, as necessary, the inorganic solid electrolyte may be used in a thin film form through a deposition process such as sputtering. The used slurry coating method may be properly selected depending on the descriptions on the coating method, the drying method and the solvent provided in the lithium ion conducting polymer.

The protective film (55) including the lithium ion conducting polymer and/or the inorganic solid electrolyte described above may also secure an effect of suppressing or preventing production of lithium dendrite generated when using lithium metal (23)/negative electrode current collector (51) as a negative electrode, while readily forming the lithium metal (23) by increasing a lithium ion transferring rate.

In order to secure the effect, the thickness of the protective film (55) needs to be limited.

The protective film (55) having a smaller thickness is advantageous for output properties of a battery, however, the protective film (55) needs to be formed to a certain thickness or higher in order to suppress side reactions between an electrolyte and lithium formed on the negative electrode current collector (51) thereafter, and furthermore, in order to effectively block dendrite growth. In the present invention, the protective film (55) preferably has a thickness of 10 nm to 50 μm. When the thickness of the protective film (55) is less than the above-mentioned range, safety may not be enhanced since exothermic reactions and side reactions occurring between lithium and an electrolyte increasing under a condition of overcharge, high temperature storage or the like are not effectively suppressed, and when the thickness is greater than the above-mentioned range in the lithium ion conducting polymer, it takes a long time for the protective film (55) composition to be impregnated or swollen by an electrolyte liquid, and lithium ion migration decreases, which may lead to overall battery performance decline.

In the lithium secondary battery of the second embodiment, constitutions other than the protective film (55) follow descriptions provided in the first embodiment.

Figure 6:
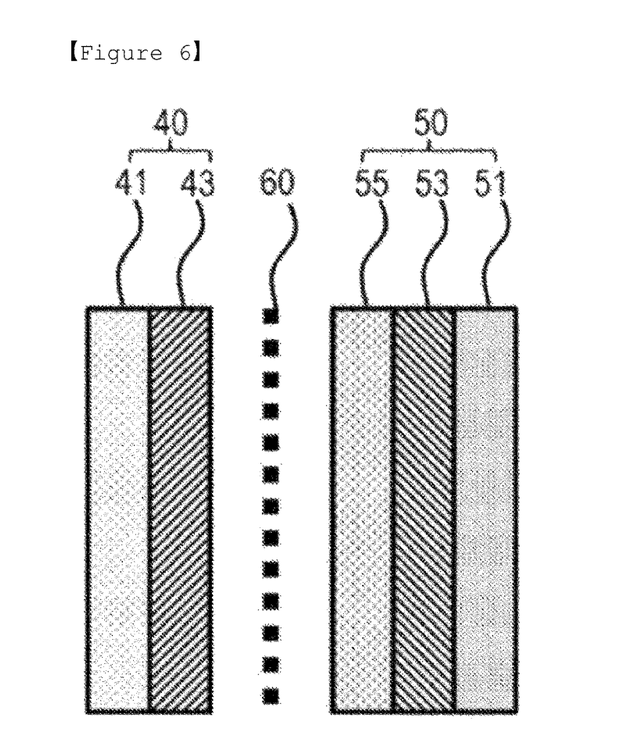
FIG. 6 is a mimetic diagram after completing initial charge of a lithium secondary battery manufactured according to a second embodiment of the present invention.

Meanwhile, as illustrated in the structures of FIG. 3 and FIG. 6, the lithium secondary battery includes a positive electrode (40), a negative electrode (50) and a separator (30, 60) and an electrolyte (not shown) provided therebetween, and the separator (30, 60) may not be included depending on the battery type.

The separator (30, 60) may be formed with a porous substrate, and as the porous substrate, porous substrates commonly used in an electrochemical device may all be used, and for example, polyolefin-based porous membranes or non-woven fabrics may be used. However, the separator is not particularly limited thereto.

The separator (30, 60) according to the present invention is not particularly limited in the material, and those commonly used as a separator (30, 60) in a lithium secondary battery as a material physically separating a positive electrode and a negative electrode and having electrolyte and ion permeability may be used without particular limit. However, as a porous, non-conducting or insulating material, those having an excellent electrolyte liquid moisture retention ability while having low resistance for ion migration of the electrolyte liquid are particularly preferred. For example, polyolefin-based porous membranes or non-woven fabrics may be used. However, the separator is not particularly limited thereto.

Examples of the polyolefin-based porous membrane may include membranes formed with a polyolefin-based polymer such as polyethylene such as high density polyethylene, linear low density polyethylene, low density polyethylene and ultra-high molecular weight polyethylene, polypropylene, polybutylene and polypentene alone, or formed with a polymer mixing these.

Examples of the non-woven fabric other than the polyolefin-based non-woven fabric may include non-woven fabrics formed with polyphenylene oxide, polyimide, polyamide, polycarbonate, polyethylene terephthalate, polyethylene naphthalate, polybutylene terephthalate, polyphenylene sulfide, polyacetal, polyethersulfone, polyetheretherketone, polyester and the like alone, or formed with a polymer mixing these, and such a non-woven fabric has a fiber form forming a porous web, and includes spunbond or meltblown form formed with long fibers.

The thickness of the separator (30, 60) is not particularly limited, but is preferably in a range of 1 μm to 100 μm, and more preferably in a range of 5 μm to 50 μm. When the separator (30, 60) has a thickness of less than 1 μm, mechanical properties may not be maintained, and when the thickness is greater than 100 μm, the separator (30, 60) functions as a resistive layer declining battery performance.

A pore size and porosity of the separator (30, 60) are not particularly limited, however, the pore size is preferably from 0.1 μm to 50 μm, and the porosity is preferably from 10% to 95%. When the separator (30, 60) has a pore size of less than 0.1 μm or porosity of less than 10%, the separator (30, 60) functions as a resistive layer, and when the pore size is greater than 50 μm or the porosity is greater than 95%, mechanical properties may not be maintained.

The electrolyte of the lithium secondary battery is a non-aqueous electrolyte formed with a non-aqueous electrolyte liquid as a lithium salt-containing electrolyte liquid, and a lithium salt. In addition thereto, an organic solid electrolyte, an inorganic solid electrolyte or the like may be included, however, the electrolyte is not limited thereto.

Examples of the non-aqueous organic solvent may include aprotic organic solvents such as N-methyl-2-pyrrolidinone, propylene carbonate, ethylene carbonate, butylene carbonate, dimethyl carbonate, diethyl carbonate, ethylmethyl carbonate, gamma-butyrolactone, 1,2-dimethoxyethane, 1,2-diethoxyethane, tetrahydroxy franc, 2-methyl tetrahydrofuran, dimethyl sulfoxide, 1,3-dioxolane, 4-methyl-1,3-dioxene, diethyl ether, formamide, dimethylformamide, dioxolane, acetonitrile, nitromethane, methyl formate, methyl acetate, phosphoric acid triester, trimethoxymethane, dioxolane derivatives, sulfolane, methylsulfolane, 1,3-dimethyl-2-imidazolidinone, propylene carbonate derivatives, tetrahydrofuran derivatives, ether, methyl propionate or ethyl propionate may be used.

The electrolyte salt included in the non-aqueous electrolyte liquid is a lithium salt. As the lithium salt, those commonly used in electrolyte liquids for a lithium secondary battery may be used without limit. For example, an anion of the lithium salt may include any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$ and $(CF_3CF_2SO_2)_2N^-$, or two or more types thereof.

As the organic solvent included in the non-aqueous electrolyte liquid, those commonly used in electrolytes for a lithium secondary battery may be used without limit, and for example, ether, ester, amide, linear carbonate, cyclic carbonate and the like may be used either alone, or as a mixture of two or more types thereof. Among these, a carbonate compound that is cyclic carbonate, linear carbonate or a mixture thereof may be typically included.

Specific examples of the cyclic carbonate compound may include any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, vinyl ethylene carbonate and halides thereof, or a mixture of two or more types thereof. Examples of the halides thereof may include fluoroethylene carbonate (FEC) and the like, but are not limited thereto.

Specific examples of the linear carbonate compound may typically include any one selected from the group consisting of dimethyl carbonate (DMC), diethyl carbonate (DEC), dipropyl carbonate, ethylmethyl carbonate (EMC), methylpropyl carbonate and ethylpropyl carbonate, or a mixture of two or more types thereof, but are not limited thereto.

Particularly, among the carbonate-based organic solvents, ethylene carbonate and propylene carbonate that are cyclic carbonate are a highly viscous organic solvent and have a high dielectric constant, and therefore, may more favorably dissociate a lithium salt in an electrolyte, and when mixing and using linear carbonate having low viscosity and low dielectric constant such as dimethyl carbonate and diethyl carbonate in a proper ratio to such cyclic carbonate, an electrolyte liquid having higher electrical conductivity may be prepared.

In addition, as the ether among the organic solvents, any one selected from the group consisting of dimethyl ether, diethyl ether, dipropyl ether, methylethyl ether, methylpropyl ether and ethylpropyl ether, or a mixture of two or more types thereof may be used, however, the ether is not limited thereto.

As the ester among the organic solvents, any one selected from the group consisting of methyl acetate, ethyl acetate, propyl acetate, methyl propionate, ethyl propionate, propyl propionate, γ-butyrolactone, γ-valerolactone, γ-caprolactone, σ-valerolactone and ε-caprolactone, or a mixture of two or more types thereof may be used, however, the ester is not limited thereto.

The non-aqueous electrolyte liquid may be injected at a proper stage in an electrochemical device manufacturing process depending on a manufacturing process and required properties of a final product. In other words, the non-aqueous electrolyte liquid may be used at a stage prior to assembling an electrochemical device or at a final stage of electrochemical device assembly.

As the organic solid electrolyte, for example, polyethylene derivatives, polyethylene oxide derivatives, polypropylene oxide derivatives, phosphoric acid ester polymers, polyagitation lysine, polyester sulfide, polyvinyl alcohol, polyvinylidene fluoride, polymers including an ionic dissociation group, and the like may be used.

As the inorganic solid electrolyte, for example, nitrides, halides, sulfates and the like of Li such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$ or $Li_3PO_4$—$Li_2S$—$SiS_2$ may be used.

With the purpose of improving charge and discharge properties and flame retardancy, for example, pyridine, triethylphosphite, triethanolamine, cyclic ether, ethylenediamine, n-glyme, hexaphosphoric acid triamide, nitrobenzene derivatives, sulfur, quinoneimine dyes, N-substituted oxazolidinone, N,N-substituted imidazolidine, ethylene glycol dialkyl ether, ammonium salts, pyrrole, 2-methoxyethanol, aluminum trichloride or the like may also be added to the non-aqueous electrolyte. In some cases, halogen-containing solvents such as carbon tetrachloride and trifluoroethylene may be further included in order to provide non-flammability, and carbon dioxide gas may be further included in order to enhance high temperature storage properties.

The shape of the lithium secondary battery described above is not particularly limited, and examples thereof may include a jelly-roll type, a stack type, a stack-folding type (including stack-Z-folding type) or a lamination-stack type, and may preferably be a stack-folding type.

After preparing an electrode assembly having the positive electrode, the separator and the negative electrode consecutively laminated, the electrode assembly is placed in a battery case, the electrolyte liquid is injected to the top of the case, and the result is sealed with a cap plate and a gasket and then assembled to manufacture a lithium secondary battery.

Herein, depending on the positive electrode material and the separator type, the lithium secondary battery may be divided into various batteries such as a lithium-sulfur battery, a lithium-air battery, a lithium-oxide battery or a lithium all-solid-state battery, and depending on the shape, may be divided into a cylinder-type, a square-type, a coin-type, a pouch-type and the like, and depending on the size, may be divided into a bulk type and a thin film type. Structures and manufacturing methods of these batteries are widely known in the art, and therefore, detailed descriptions thereon are not included.

The lithium secondary battery according to the present invention may be used as a power supply of devices requiring high capacity and high rate properties. Specific examples of the device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto. Hereinafter, preferred examples are provided in order to illuminate the present invention, however, the following examples are for illustrative purposes only, and it is obvious to those skilled in the art that various modifications and changes may be made within the scope of category and technological ideas of the present invention, and such modifications and changes also belong to the attached claims.

Example 1: Manufacture of Negative Electrode Free Battery (1) Preparation of Positive Electrode After mixing $LiCoO_2$ (LCO):Super-P:binder (PVdF) in a weight ratio of 95:2.5:2.5 in 30 ml of N-methyl-2-pyrrolidone, $Li_2NiO_2$ (L2N) was added thereto in a weight ratio of 20% with respect to the LCO. Subsequently, each was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Negative Electrode

As a negative electrode, Cu foam having porosity of 75% and a thickness of 100 μm was prepared as a negative electrode current collector.

(3) Preparation of Organic Electrolyte Liquid

An electrolyte liquid prepared by dissolving 1 M $LiPF_6$ and 10% by weight of fluoroethylene carbonate (FEC) in an organic solvent formed with ethylene carbonate (EC):diethyl carbonate (DEC):dimethyl carbonate (DMC) in a volume ratio of 1:2:1 was prepared.

(4) Manufacture of Negative Electrode Free Battery

A separator and the organic electrolyte liquid of (3) were provided between the positive electrode prepared in (1) and the negative electrode current collector to prepare an electrode assembly, and after placing the electrode assembly inside a case, the organic electrolyte liquid was injected thereto to manufacture a lithium secondary battery.

Example 2: Manufacture of Negative Electrode Free Battery Provided with PVdF-HFP Protective Film (1) Preparation of Positive Electrode After mixing $LiCoO_2$ (LCO):Super-P:binder (PVdF) in a weight ratio of 95:2.5:2.5 in 30 ml of N-methyl-2-pyrrolidone, $Li_2NiO_2$ (L2N) was added thereto in a weight ratio of 20% with respect to the LCO. Subsequently, each was mixed for 30 minutes using a paste face mixer to prepare a slurry composition. Herein, the weight of the added LCO was 15 g.

Subsequently, the prepared slurry composition was coated on a current collector (Al foil, thickness 20 μm), and the result was dried for 12 hours at 130° C. to prepare a positive electrode.

(2) Preparation of Protective Film-Formed Negative Electrode Current Collector

A solution for forming a protective film was prepared by mixing PVdF-HFP to an acetone solvent so as to have a concentration of 10% by weight.

The solution for forming a protective film was coated on a Cu foam-type Cu current collector having porosity of 75% and a thickness of 100 μm, and the result was dried for 3 hours at 50° C. to form a protective film (thickness: 10 μm) on the Cu current collector.

(3) Preparation of Organic Electrolyte Liquid

An electrolyte liquid prepared by dissolving 1 M $LiPF_6$ and 10% by weight of fluoroethylene carbonate (FEC) in an organic solvent formed with ethylene carbonate (EC):diethyl carbonate (DEC):dimethyl carbonate (DMC) in a volume ratio of 1:2:1 was prepared.

(4) Manufacture of Negative Electrode Free Battery

A PE separator and the organic electrolyte liquid of (3) were provided between the positive electrode prepared in (1) and the negative electrode current collector to prepare an electrode assembly, and after placing the electrode assembly inside a case, the organic electrolyte liquid was injected thereto to manufacture a lithium secondary battery.

Example 3: Manufacture of Negative Electrode Free Battery

A negative electrode free battery was manufactured in the same manner as in Example 1 except that the Cu current collector was employed to have porosity of 50%.

Example 4: Manufacture of Negative Electrode Free Battery

A negative electrode free battery was manufactured in the same manner as in Example 1 except that the Cu current collector was employed to have porosity of 90%.

Example 5: Manufacture of Negative Electrode Free Battery

A negative electrode free battery was manufactured in the same manner as in Example 1 except that the Cu current collector was employed to have a thickness of 20 μm.

Example 6: Manufacture of Negative Electrode Free Battery

A negative electrode free battery was manufactured in the same manner as in Example 1 except that the Cu current collector was employed to have a thickness of 200 μm.

Comparative Example 1

A negative electrode free battery was manufactured in the same manner as in Example 1 except that Cu foil having a thickness of 20 μm was used as the negative electrode current collector instead of Cu foam.

Comparative Example 2

A negative electrode free battery was manufactured in the same manner as in Example 2 except that Cu foil having a thickness of 20 μm was used as the negative electrode current collector instead of Cu foam.

Comparative Example 3

A negative electrode free battery was manufactured in the same manner as in Example 1 except that Cu foam having a thickness of 220 μm was used as the negative electrode current collector.

Experimental Example 1: Lithium Secondary Battery Characteristic Analysis

The batteries of Examples 1 to 6 and Comparative Examples 1 to 3 were charged and discharged under a condition of charging with 0.2 C, 4.25 V CC/CV (5% current cut at 1 C), and discharging with 0.5 C CC 2.5 V to manufacture a lithium metal-formed lithium secondary battery. Subsequently, the number of cycles reaching 80% with respect to the initial capacity was recorded in the following Table 2.

Experimental Example 2: Lithium Secondary Battery Characteristic Analysis

The batteries of Examples 1 to 6 and Comparative Examples 1 to 3 were charged and discharged under a condition of charging with 0.5 C, 4.25 V CC/CV (5% current cut at 1 C), and discharging with 0.5 C CC 2.5 V to manufacture a lithium metal-formed lithium secondary battery. Subsequently, the number of cycles reaching 80% with respect to the initial capacity was recorded in the following Table 2.

Experimental Example 3: Lithium Secondary Battery Characteristic Analysis

The batteries of Examples 1 to 6 and Comparative Examples 1 to 3 were charged and discharged under a condition of charging with 1.0 C, 4.25 V CC/CV (5% current cut at 1 C), and discharging with 0.5 C CC 2.5 V to manufacture a lithium metal-formed lithium secondary battery. Subsequently, the number of cycles reaching 80% with respect to the initial capacity was recorded in the following Table 2.

The number of cycles at 80% with respect to the initial capacity is shown in the following Table 2, and normalized results based on the number of cycles of Comparative Example 1 can be identified.

The test is for proving the effects of a three-dimensional structure of the negative electrode current collector, and it was identified that a cycle lifetime was improved in Examples 1 to 4 and Example 6 compared to the lithium secondary batteries of Comparative Examples 1 to 3 when high-rate charging.

In addition, the test is for proving the effects of a protective film, and when comparing Examples 1 and 2, and Comparative Examples 1 and 2, the cycle of the battery having a protective film was more superior than the battery without a protective film at a low C-rate of 0.2 C, however, when high-rate charging with 0.5 C or greater, resistance increased and a cycle lifetime decreased.

It was identified that Examples 3 and 5 did not exhibit excellent results compared to Comparative Example 1, and this was due to the fact that an electron transfer effect decreased in a three-dimensional structure due to low porosity of the thin-filmed three-dimensional-structured negative electrode current collector.

Examples 4 and 6, and Comparative Example 3 exhibited an improved battery lifetime compared to Comparative Example 1, but caused a problem of reducing energy density per battery volume due to the thickness of the current collector.

Ultimately, a most superior cycle lifetime was identified in Example 1 compared to Comparative Example 1 even when high-rate charging.

TABLE 2

| | Number of Cycles at 80% with Respect to Initial Capacity (Normalize Based on Comparative Example 1) | | |
|---|---|---|---|
| | 0.2 C | 0.5 C | 1 C |
| Example 1 | 37% | 20% | 36% |
| Example 2 | 42% | 13% | 9% |
| Example 3 | 5% | 7% | 9% |
| Example 4 | 11% | 13% | 18% |
| Example 5 | −5% | 0% | 0% |
| Example 6 | 11% | 13% | 18% |
| Comparative Example 1 | Reference | Reference | Reference |
| Comparative Example 2 | 5% | −7% | −9% |
| Comparative Example 3 | 5% | 7% | 9% |

REFERENCE NUMERAL 10, 40: Positive Electrode
11, 41: Positive Electrode Current Collector
13, 43: Positive Electrode Mixture
20, 50: Negative Electrode
21, 51: Negative Electrode Current Collector
23: Lithium Metal
30, 60: Separator
55: Protective Film

The invention claimed is:

1. A lithium secondary battery comprising:
a positive electrode;
a negative electrode;
a separator between the positive electrode and the negative electrode,
wherein the negative electrode forms a protective film on a surface adjoining the separator; and
an electrolyte provided between the positive electrode and the negative electrode,
wherein the negative electrode comprises a negative electrode current collector having a three-dimensional structure form with pores formed therein,
the lithium secondary battery is configured for lithium ions to migrate from the positive electrode to form lithium metal on the negative electrode current collector by charge and discharge of the battery,
wherein the negative electrode current collector has a thickness of 80 μm to 200 μm,
wherein the negative electrode current collector has a porosity of 50% to 90%, and
wherein the protective film consisting of a lithium ion conducting polymer selected from the group consisting of polyacrylonitrile (PAN), polymethyl methacrylate (PMMA), polyvinylidene fluoride (PVDF), and polyvinylidene fluoride-hexafluoropropylene (PVDF-HFP), and one or more lithium salts selected from the group consisting of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, LiSCN, LiC(CF$_3$SO$_2$)$_3$, (CF$_3$SO$_2$)$_2$NLi, (FSO$_2$)$_2$NLi, chloroborane lithium, lower aliphatic carboxylic acid lithium, lithium tetraphenylborate and lithium imide.

2. The lithium secondary battery of claim 1, wherein the negative electrode current collector comprises one or more material selected from the group consisting of copper, stainless steel (SUS), aluminum, nickel, titanium and baked carbon.

3. The lithium secondary battery of claim 1, wherein the lithium metal is formed through a one-time charge in a voltage range of 4.5 V to 2.5 V.

4. The lithium secondary battery of claim 1, wherein a positive electrode mixture formed in the positive electrode comprises a positive electrode active material and a lithium metal compound in a weight ratio of 1:9 to 9:1.

5. The lithium secondary battery of claim 4, wherein the positive electrode active material is mixed with the lithium metal compound or forms a core-shell structure therewith.

6. The lithium secondary battery of claim/wherein the positive electrode active material is one or more types selected from the group consisting of LiCoO$_2$, LiNiO$_2$, LiMnO$_2$, LiMn$_2$O$_4$, Li(Ni$_a$Co$_b$Mn$_c$)O$_2$ (0<a<1, 0<b<1, 0<c<1, a+b+c=1), LiNi$_{1-Y}$Co$_Y$O$_2$ (0≤Y<1), LiCo$_{1-Y}$Mn$_Y$O$_2$ (0≤Y<1), LiNi$_{1-Y}$Mn$_Y$O$_2$ (0≤Y<1), Li(Ni$_a$Co$_b$Mn$_c$)O$_4$ (0<a<2, 0<b<2, 0<c<2, a+b+c=2), LiMn$_{2-z}$Ni$_z$O$_4$ (0<Z<2), LiMn$_{2-z}$Co$_z$O$_4$ (0<Z<2), Li$_x$M$_y$Mn$_{2-y}$O$_{4-z}$A$_z$ (0.9≤x≤1.2, 0<y<2, 0≤z≤0.2, M is one or more of Al, Mg, Ni, Co, Fe, Cr, V, Ti, Cu, A, Ca, Zn, Zr, Nb, Mo, Sr, Sb, W, Ti and Ai, A is one or more anions with a valency of −1 or −2), $Li_{1-a}Ni_b M'_{1-b}, O_{2-c}A'_c$ ($0 \leq a \leq 0.1$, $0 \leq b \leq 0.8$, $0 \leq c < 0.2$, M' is one or more types selected from the group consisting of 6-coordinated stable elements such as Mn, Co, Mg and Al, and A' is one or more anions having a valency of −1 or −2), $LiCoPO_4$ and $LiFePO_4$.

7. The lithium secondary battery of claim 4, wherein the lithium metal compound is represented by any one of the following Chemical Formulae 1 to 8:

$$Li_2Ni_{1-a}M^1{}_aO_2 \quad \text{[Chemical Formula 1]}$$

in the formula, a is $0 \leq a < 1$, and $M^1$ is one or more elements selected from the group consisting of Mn, Fe, Co, Cu, Zn, Mg and Cd;

$$Li_{2+b}Ni_{1-c}M^2{}_cO_{2+d} \quad \text{[Chemical Formula 2]}$$

in the formula, $-0.5 \leq b < 0.5$, $0 \leq c \leq 1$, $0 \leq d < 0.3$, and $M^2$ is one or more types of elements selected from the group consisting of P, B, C, Al, Sc, Sr, Ti, V, Zr, Mn, Fe, Co, Cu, Zn, Cr, Mg, Nb, Mo and Cd;

$$LiM^3{}_eMn_{1-e}O_2 \quad \text{[Chemical Formula 3]}$$

in the formula, $0 \leq e < 0.5$, and $M^3$ is one or more elements selected from the group consisting of Cr, Al, Ni, Mn and Co;

$$Li_2M^4O_2 \quad \text{[Chemical Formula 4]}$$

in the formula, $M^4$ is one or more elements selected from the group consisting of Cu and Ni;

$$Li_{3+f}Nb_{1-g}M^5{}_gS_{4-h} \quad \text{[Chemical Formula 5]}$$

in the formula, $-0.1 \leq f \leq 1$, $0 \leq g \leq 0.5$, $-0.1 \leq h \leq 0.5$ and $M^5$ is one ter more types of elements selected from the group consisting of Mn, Fe, Co, Cu, Zn, Mg and Cd;

$$LiM^6{}_iMn_{1-i}O_2 \quad \text{[Chemical Formula 6]}$$

in the formula, $0.05 \leq i \leq 0.5$, and $M^6$ is one or more elements selected from the group consisting of Cr, Al, Ni, Mn and Co;

$$LiM^7{}_{2j}Mn_{2-2j}O_4 \quad \text{[Chemical Formula 7]}$$

in the formula, $0.05 \leq j < 0.5$, and $M^7$ is one or more elements selected from the group consisting of Cr, Al, Ni, Mn and Co;

$$Li_k\text{-}M^8{}_m\text{-}N_n \quad \text{[Chemical Formula 8]}$$

in the formula, $M^8$ represents an alkaline-earth metal, $k/(k+m+n)$ is from 0.10 to 0.40, $m/(k+m+n)$ is from 0.20 to 0.50, and $n/(k+m+n)$ is from 0.20 to 0.50.

8. The lithium secondary battery of claim 1, wherein the positive electrode comprises one or more positive electrode materials selected from the group consisting of $Li_xVO_3$ ($1 \leq x \leq 6$), $Li_3Fe_2(PO_4)_3$, $Li_3Fe_2(SO_4)_3$, $Li_3V(PO_4)_3$, $MnO_2$, $MoO_3$, $VO_2$, $V_2O_5$, $V_6O_{13}$, $Cr_3O_8$, $CrO_2$, $Al_2O_3$, $ZrO_2$, $AlPO_4$, $SiO_2$, $TiO_2$ and MgO.

9. The lithium secondary battery of claim 8, wherein the positive electrode mixture has a loading amount of 1 mAh/$cm^2$ to 10 mAh/$cm^2$.

10. The lithium secondary battery of claim 1, wherein the protective film has a thickness of 10 nm to 50 μm.

* * * * *